W. I. STAAF.
WATER TRAP.
APPLICATION FILED MAR. 21, 1912.
1,076,324.
Patented Oct. 21, 1913.
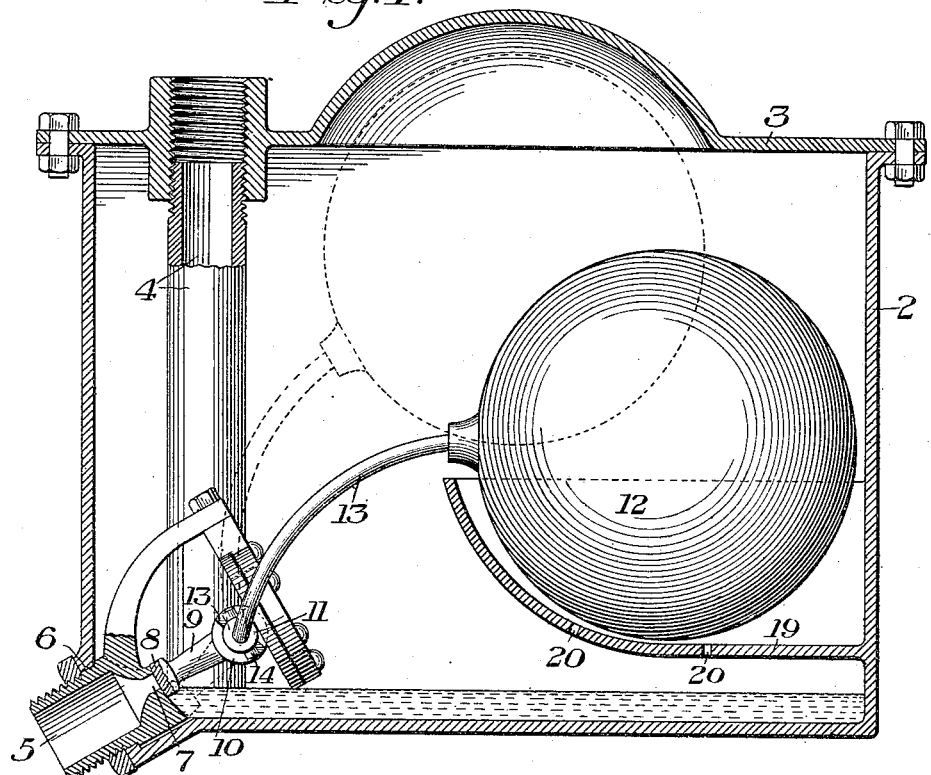
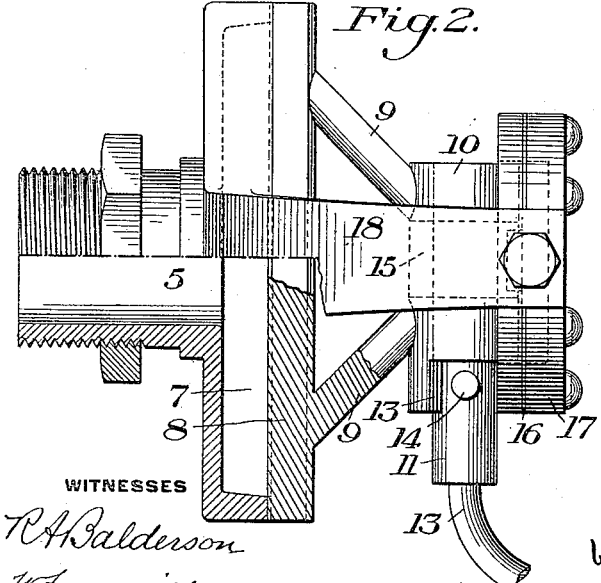
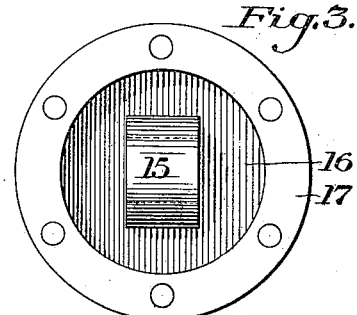
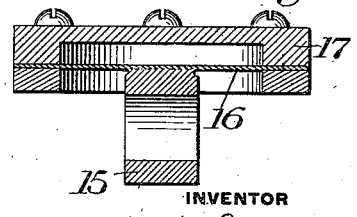
WITNESSES
R. A. Balderson
INVENTOR
W. I. Staaf
by Bakewell, Byrnes, Parmelee,
Attys

UNITED STATES PATENT OFFICE.

WERNER I. STAAF, OF PITTSBURGH, PENNSYLVANIA, ASSIGNOR OF ONE-HALF TO EDWARD B. TYLER, OF PITTSBURGH, PENNSYLVANIA.

WATER-TRAP.

1,076,324.  Specification of Letters Patent.  Patented Oct. 21, 1913.

Application filed March 21, 1912. Serial No. 685,316.

*To all whom it may concern:*

Be it known that I, WERNER I. STAAF, a resident of Pittsburgh, Allegheny county, Pennsylvania, have invented a new and useful Water-Trap, of which the following is a full, clear, and exact description, reference being had to the accompanying drawings, forming part of this specification, in which—

Figure 1 is a vertical longitudinal section through a water trap embodying my invention; Fig. 2 is a plan view showing the valve parts; Fig. 3 is a plan view of the diaphragm member; and Fig. 4 is a sectional view of the same.

My invention has relation to water traps, of the class in which the outlet valve is actuated by means of a float; and is designed to provide a novel arrangement of the valve which controls the outlet from the trap, and to provide means for balancing such valve.

A further object of the invention is to provide means for insuring that the valve shall be held open until the trap is practically emptied of its contents, and thus prevent "wire-drawing" at the valve.

The nature of my invention will be best understood by reference to the accompanying drawings, in which I have shown the preferred embodiment thereof, and which will now be described, it being premised, however, that various changes can be made in the details of construction and arrangement of the several parts without departing from the spirit and scope of my invention as defined in the appended claims.

In these drawings, the numeral 2 designates the trap vessel, which is provided with the removable cover 3, and which has the inlet pipe 4. This pipe 4 preferably leads downwardly within the trap vessel to a point near the bottom thereof.

5 designates the outlet connection, which is preferably located in one of the lower corner portions of the vessel. This connection is shown as consisting of a hollow cylindrical plug, screw-threaded in an oblique position within a suitable seat 6, and having its inner end portion contracted and transversely elongated to form a narrow discharge orifice 7. The walls of this orifice are slightly concaved to seat the convex face of a valve 8. This valve is shown as being carried by arms 9 extending from a hub 10, which is loosely sleeved on a shaft 11.

12 is a float, having an arm 13 connected to the shaft 11. The hub member is slotted or cut away to form shoulders 13 for engagement with pins 14 carried by said shaft, said shoulders and pins forming a clutch connection between the float-operated shaft and the hub of the valve. The shaft 11 is journaled in the lug 15, which is secured to a diaphragm 16 supported in a frame 17, which is shown as secured to a bracket arm 18 attached to the outlet plug 5. The effective area of the diaphragm 16 is equal to or slightly greater than the area of the valve which is exposed to the water pressure within the trap. In this manner the valve is balanced by the opposing pressures thereon and on the diaphragm, so that it can open freely notwithstanding the pressure of the water in the trap.

When in its lowered position, the float 12 extends into a receptacle 19 placed within the float chamber, and having one or more relatively small perforations 20 in its bottom wall. By reason of this receptacle, after the valve has been opened, and the float commences to fall, a considerable amount of water will be retained in the receptacle 19, since the only means of escape of such water is through the relatively small perforations 20. The water in this receptacle will, therefore, prevent the sudden return of the float to its lowermost position, and will hold the float sufficiently elevated to keep the outlet valve opened until such time as substantially all the water has drained out through the perforations 20. This permits the discharge of substantially all the water contained in the vessel.

Without the provision of the device just described, the valve would close before all the water had escaped from the trap and a slight increase in the amount of water would start to open the valve, this operation being repeated indefinitely. By the provision of the receptacle and escape opening, together with the clutch connection between the float and the pivot of the valve (the latter providing some lost motion between the float and valve) such "fluttering" action of the valve is prevented.

The advantages of my invention result from the provision of the simple and efficient means for balancing the valve in the manner described, and also from the provision of means for insuring the valve being held open until substantially all the water has been discharged.

What I claim is:—

1. A trap having a discharge opening, a pivoted valve for controlling said opening, a diaphragm member to which the valve is pivoted, and an actuating float connected to the valve to swing it on its pivot; substantially as described.

2. A trap having a discharge opening, a diaphragm within the trap opposite the said opening, an oscillating valve pivoted to the diaphragm, and a float connected to the valve pivot, substantially as described.

3. A trap having a discharge opening, a diaphragm supported within the trap opposite the said opening, a valve pivoted to the diaphragm, and a float having a clutch connection with the pivot of the valve, substantially as described.

4. A trap having an outlet opening, a diaphragm within the trap opposite the opening, said diaphragm having one of its surfaces exposed to the pressure of the liquid within the trap, and a valve pivoted to the diaphragm, said valve having an exposed area substantially equal to the area of the exposed portion of the diaphragm, substantially as described.

5. A trap having a discharge opening, a diaphragm opposite the said opening, a valve pivoted to the diaphragm, a float having a clutch connection with the pivot of the valve, and a receptacle for receiving and stopping the float in its lowermost position, said receptacle having an escape opening in its bottom, substantially as described.

6. A trap having a discharge opening, a pivoted valve for controlling said opening, a diaphragm member to which the valve is pivoted, an actuating float connected to the valve to swing it on its pivot, and means for retarding the fall of the float; substantially as described.

7. A trap having a discharge opening formed with concave valve seating edges, a pivoted valve for controlling said opening, and a diaphragm member to which the valve is pivoted, said valve being movable transversely of the said opening and having a curved seating face, together with means for oscillating the valve; substantially as described.

In testimony whereof, I have hereunto set my hand.

WERNER I. STAAF.

Witnesses:
H. M. CORWIN,
GEO. H. PARMELEE.

---

Copies of this patent may be obtained for five cents each, by addressing the "Commissioner of Patents, Washington, D. C."